(12) United States Patent
Taillens

(10) Patent No.: US 7,010,314 B1
(45) Date of Patent: Mar. 7, 2006

(54) METHOD FOR REMOTE CONNECTION OF MACHINES AND CORRESPONDING ELECTRONIC ANALOG APPARATUS

(75) Inventor: Jean-François Taillens, Preverenges (CH)

(73) Assignee: Jean-Francois Taillens, (FR)

( * ) Notice: Subject to any disclaimer, the term of this patent is extended or adjusted under 35 U.S.C. 154(b) by 0 days.

(21) Appl. No.: 09/700,697

(22) PCT Filed: May 17, 1999

(86) PCT No.: PCT/FR99/01173

§ 371 (c)(1),
(2), (4) Date: Feb. 20, 2001

(87) PCT Pub. No.: WO99/60499

PCT Pub. Date: Nov. 25, 1999

(30) Foreign Application Priority Data

May 19, 1998 (FR) .................................. 98 06494

(51) Int. Cl.
*H04B 7/00* (2006.01)
(52) U.S. Cl. .................. 455/518; 455/519; 455/414.3; 455/416
(58) Field of Classification Search ................ 455/517, 455/518, 519, 414.1, 414.3, 416, 500; 340/993, 340/825.49
See application file for complete search history.

(56) References Cited

U.S. PATENT DOCUMENTS 4,173,016 A    10/1979   Dickson (Continued)

FOREIGN PATENT DOCUMENTS

DE    35 08 448 A    9/1986

(Continued)

OTHER PUBLICATIONS

International Search Report of PCT/FR99/01173, as published with WO 99/60499.

(Continued)

*Primary Examiner*—Edan Orgad
(74) *Attorney, Agent, or Firm*—Young Law Firm, P.C.

(57) ABSTRACT

The method for remote connection consists in identifying poles of interest common to several persons according to a technique which detects the areas of activity and the poles of interest and broadcasts them. The itinerant apparatus (1) comprises a data processing module (2) connected directly or not by a bus (3) to a display module (4), data selecting means (5) sound generating means (6) and several interface means (10, 11, 12) capable of connecting or adapting the device to other remote communication means. The apparatus (1) is capable of broadcasting (9) and picking up (8) codes selected in a nomenclature common to all the machines of the switchboard to encounter another apparatus containing at least a similar code. The machines (16*a*, 16*b*, 16*c*, 19*d*, 16*e*, 16*f*) exchange together their respective selections in interactive mode which passes through a transmission space (17, 18) systematically produced when at least two machines meet within operational distance. A sound signal and/or the display of parameters concerning the desired activities is activated if the selected codes in the machines are matching. The invention is useful in particular for identifying, aims, poles of interest and/or areas of activity common and/or complementary to several persons located in the proximity of one another.

9 Claims, 1 Drawing Sheet

U.S. PATENT DOCUMENTS

| | | | |
|---|---|---|---|
| 5,086,394 A * | 2/1992 | Shapira | 705/1 |
| 5,515,426 A * | 5/1996 | Yacenda et al. | 379/201.07 |
| 5,724,417 A * | 3/1998 | Bartholomew et al. | 379/211.05 |
| 5,809,130 A * | 9/1998 | Ayala | 379/266.01 |
| 5,999,088 A * | 12/1999 | Sibbitt | 340/7.55 |
| 6,081,693 A * | 6/2000 | Wicks | 340/7.21 |
| 6,459,910 B1 * | 10/2002 | Houston | 455/563 |
| 6,549,768 B1 * | 4/2003 | Fraccaroli | 455/456.3 |
| 6,819,919 B1 * | 11/2004 | Tanaka | 455/414.1 |
| 6,868,333 B1 * | 3/2005 | Melen | 701/200 |
| 6,882,313 B1 * | 4/2005 | Fan et al. | 342/457 |

FOREIGN PATENT DOCUMENTS

| | | |
|---|---|---|
| EP | 0 259 717 A | 3/1988 |
| WO | WO 97 01137 A | 1/1997 |

OTHER PUBLICATIONS

SwapTec Technical Report; extract from: CSEM Technical Report NB.981 Swaptec PoP; A. El Hoiydi, J.-D. Decotignie—Project V1.0, Oct. 30, 2001 (6pgs).

A. El-Hoiydi, CSEM ERN Report, V1.0B, Feb. 18, 2003, Project SWAP11, "Protocol and Software Specifications" (38pgs).

A. El-Hoiydi, CSEM ERN Report, V1.0B, Feb. 18, 2003, Project SWAP11, "Protocol and Validation Tests" (20pgs).

A. El-Hoiydi, CSEM ERN Report, V1.0B, Feb. 18, 2003, Project SWAP11, "Installation Guide" (14pgs).

A. El Hoiydi, J.-D. Decotignie V1.0, Oct. 30, 2001, Project Class A, CSEM Technical Report No. 981, "Swaptec Proof of Product" (44 pgs).

* cited by examiner

METHOD FOR REMOTE CONNECTION OF MACHINES AND CORRESPONDING ELECTRONIC ANALOG APPARATUS

This application is a §371 National Phase Patent Application of International Patent Application No. PCT/FR99/01173, with an International Filing Date of Nov. 19, 2000, which claims priority to French Patent Application No. 98/06494, filed May 19, 1998, both applications of which are hereby incorporated herein in their entirety and from which priority is hereby claimed under 35 U.S.C. §120.

BACKGROUND OF THE INVENTION

1. Field of the Invention

The present invention relates to the remote connection of several persons and devices by broadcasting communications in the ether with the use of at least one device having a transmitter function and at least a second device having a receiver function. It concerns above all a method consisting of assigning a code to the communications broadcast in the ether.

2. Description of the Related Art

At present, contacts are habitually made by reading information in the press, telephone books and other catalogues in which the activities offered are classified by category, for example, hotels, restaurants, garages, picked up from the press and other means of communication by sectors of interest such as services, purchase-sales offers, leisure interests etc., making the tasks of research more and more difficult because of the increasing number of elements advertised everywhere in every language. Moreover, these means are practically impossible to be used in real time and in situ, during travel, professional and leisure occupations, this information or data also being transmitted by means of radio or television. The selective broadcasting of information for a population requiring information by selective broadcasting of information from a regional transmitter is also known.

These known techniques require the centralization of data before they are published or broadcast. The result is that these offers do not especially correspond to the expectation of the person and not perhaps in his language.

An additional transmitter re-broadcasting information from the regional transmitter is also known (see EP 0 259 717).

The latter procedure involves the use of at least three devices two of which are pre-set between themselves and in communication without any simultaneous interfering transmission in their environment. Thus there is a severe geographic limit and a difficulty in using a fourth device. Moreover, it only concerns selective broadcasting of information transmitted elsewhere, thus again the absence of choice of the timing of the transmission for the user of the device selecting the information.

An interactive mode of application is also known by using a timed transmitter-receiver device. In this method it is essential that one of the two devices does not transmit during the broadcasting, this method of radio-paging known under the name of "Alphapage™" "Alphapage™" is piloted by a switchboard and is only usable in an area where a set-up infrastructure has been built, contact between persons being established by telephone and needing a key, under the form of a frequency attributed to each end user, thus the limitation to a group of persons established ahead. U.S. Pat. No. 5,086,394 describes the individual devices activated by remote paging.

Thus, the connecting of persons with common poles of interest is habitually carried out through the Internet and by the broadcasting of information and announcements through the traditional media such as television or by reading press advertisements in dialogue mode (one-to-many).

These known techniques for selective broadcasting of information for a population demanding information by selection of announcements broadcast from a regional transmitter (see EP 0 259 717), implies the centralization of data and the identification of those concerned ahead of broadcasting and/or publication. The result is that these solutions no longer correspond conveniently to the expectation of the end user, nor even perhaps his language.

Data transmission in dialogue mode is also known (one-to-one) and in distribution mode (one-to-many) with present day technologies such as cellular telephone networks (GSM, UMTS, Bluetooth etc.).

SUMMARY OF THE INVENTION

The aim of the present invention is to remedy these drawbacks. Thus, the method of connection of persons or nomadic devices by broadcasting selective elements of messages in the ether by at least one transmitter-receiver device in transmitting function and at least one second transmitter-receiver device in receiving function in order to establish, in a direct fashion, selected interactive links by means of identification keys for different sectors of activity, common poles of interest and user codes, in which the respective users are connected by said devices comprising at least the following means: a data processing module linked directly or not by a bus to a sound or other signal generator module and a memory comprising a programmable data base. The devices being transmitter-receivers alternately broadcast and receive at least one selected code from the pre-programmed data base according to a standard common to the said devices, the said standard comprising a nomenclature typically of tree structure for the goals, poles of interest and/or common sectors of activity defined in the language of the person by divisions, groups, classes and positions.

The method consists of:
 selecting one or several poles of interest and/or sectors of activity of the standard in the first device,
 memorizing the pole of interest and/or sector of activity selected,
 transmitting the assigned code to the pole of interest and/or sector of activity selected and alternately receiving the eventual codes of the standard transmitted by other devices,
 moving the first device until it reaches an operational distance from at least one other device alternately broadcasting and receiving one of the said codes of the standard to receive the code transmitted by this second device, the devices located within his same operational distance generating a transmission space.

The communications are announcements chosen by any person and transmitted by the devices at any time.

At the moment of transmission, the devices located at an operational distance generate a transmission space by alternately broadcasting and receiving at least one of the said selected codes, the devices together managing the communications of said codes by means of an appropriate communication protocol which occupies the said transmission space generated by the devices which, if there is code matching, release a sound signal and/or the display of the parameters of the collective nomenclature corresponding to the matching code(s) in each device, said display being in the programmed language.

This allows any person whatsoever to communicate with another person, even speaking a different language. Thus the devices can be used abroad.

The nomadic devices being located and functioning at an operational distance present the following stages:
  generation of a transmission space (17, 18) by moving and switching on the devices,
  identification n by means of the appropriate communication protocol of the matching codes,
  transit in the transmission space of selected identification codes,
  alternate switching of said devices to the situation of master or slave to enable them to broadcast, receive, identify and manage respectively between themselves the said identification codes and their respective messages.

This allows several devices to communicate as soon as they are at an operational distance for communication, a distance determined relative to the power of the transmission modules and the sensitivity of the receiver modules. A transmission space is created and the communication protocol is activated. Together they operate a protocol, which generates the transmission space in which the broadcast codes transit, especially the codes appropriate to those selected in the other devices of the transmission space. As soon as at least one selected code in each of them is matching, the devices inform that there is an opportunity by at least one sound signal and/or a visual by displaying the element(s) and message(s) concerned on a screen.

According to other specifications:

The first nomadic device arriving at the transmission distance generated by the simultaneous operation of other nomadic devices carries out the following stages:
  adapting to the conversational mode, then
  switching alternately in the master-slave mode, for broadcasting its selected codes so that the other devices carry out the following steps:
    entering and comparing internally the analog codes and
    signaling the opportunities by display or sound means in the case of the matching of at least one code common to the two devices.

The nomenclature is modifiable and extensible by reformatting transmitted by cable, induction or high frequency transmission, from an external programming device, by setting the programming of the devices on "re-programming" with the help of selection means and/or introduction of data and display means.

Another aim of the invention is a device for remote connection of persons with common goals, poles of interest and/or sectors of activity, making it possible to carry out the above method. The device is characterized in that, being nomadic, it comprises at least one management module for the ensemble, typically a microcontroller, linked directly or not by a bus, to at least one display means, to at least one means of selection and/or data introduction, to at least one sound or other signal generator means, linked to at least one supply module. The data transmission ensemble also comprises at least one transmission means and one receiver means for waves, in particular high frequency waves, linked directly or not through the micro-controller to the memory which also contains operational software of the programmable database and linked to a second memory housing a downloadable database in addition to other operational software. The device is able to broadcast and receive the one or several selected memorized codes in the standard nomenclature linking with at least one other remote connection device located in the same operational distance, broadcasting and simultaneously receiving at least one of the said operational codes. The devices manage together the communication of said codes by an established conversational mode which circulates in a physical or non-physical transmission space generated by the devices which activate, if there is code matching, a sound signal and/or display of the selected parameters related to the matching code(s) of each device.

According to other specifications:

the said data transmission ensemble comprises, besides one or several interface means able to link the device with other means of remote connection, in particular one of the interface means being able to connect a fixed receiver physically connected to the cable networks in such a way as to make it possible for peripheral devices such as computers or cable televisions to bring them selectivity services through high rated networks such as Internet of other tel-networks. Another of the interface means communicates with a mobile receiver linked by radio such as so-called alphapage devices, certain radio receivers or television sets, so that the user can select the sectors of activity or poles of interest broadcast.

the material and computing components for transmission and processing of data are collected in a miniaturized and modular integrated circuit able to manage in stand-alone manner and directly the telematic functions of the method in a way compatible with the known circuit devices of cellular telephony, paging, computing or data management to allow them to communicate between themselves while adding the services of the above method to their own.

In order that the user can carry with him the device according to the invention and receive discretely the criteria of activities broadcast by the neighboring devices at operational distance, the elements of the device according to the invention, such as the data transmission ensemble, the management module of the ensemble, connected by the bus to the display means, to the selection and/or data introduction means, the sound or other signal generator means, provided with energy by the supply module, are housed in a casing in such a way as to constitute a portable device.

In order that the user can adapt, choose, modify or add a code or a function which he has already selected in the processing unit, he has the possibility of switching the internal management of his device by means of selection and data introduction, and then to carry out any useful command in which each element is viewed on the display means, said display means, the means of selection and/or data introduction, the sound or other signals generator means, and the interface means being linked to the management module of the ensemble by at least one electronic interface bus.

BRIEF DESCRIPTION OF THE DRAWINGS

Other specifications and advantages of the invention will be shown in the description given as a non-limiting example below and with regard to the attached drawings in which.

DESCRIPTION OF THE PREFERRED EMBODIMENTS

Figure 1:
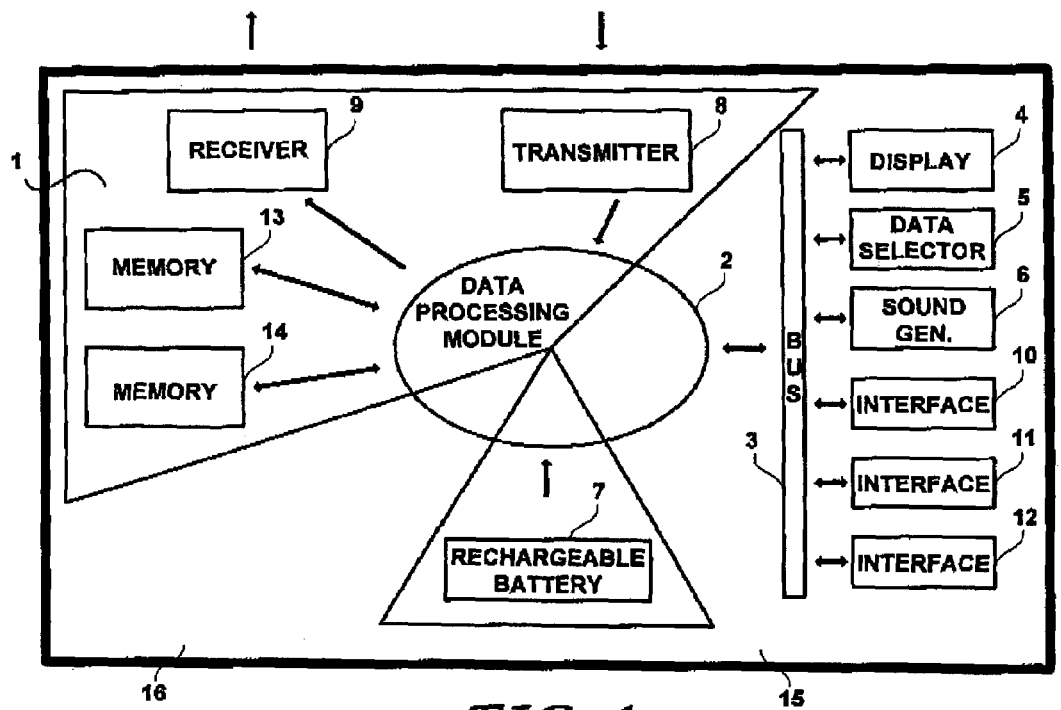
FIG. 1 represents the operational diagram for a device according to the invention.

The analog electronic device 1 shown in FIG. 1 comprises a module 2 for data processing linked directly or not to a bus 3 connected to a display module 4, a data selector 5, a sound generator 6, a rechargeable battery 7, a transmitting means 8, a receiver 9 of data transmission and several interface means 10, 11 and 12, able to link or adapt the device to other means of remote communications.

The operation and application software are safeguarded in the memories 13 and 14. A common reference nomenclature contained in memory 13 is presented by sections, groups, classes and locations to be read in columns to facilitate the choice of selection. This base nomenclature comprises all the selections of the service domains, market offers and demands and leisure activities, which it is possible to extend and correct at any time by adding elements in memory 14. For example, the section "Tourism" which is divided into groups such as "Travel, holidays"+"Hotel"+"Restaurants"+ "Excursions, cruises" in their turn divided into classes such as "Hotel"+"Restaurant"+"Inns, B&B", divided again into locations such as "Town, countryside, mountain, sea" in such a way that the user selects, for example:

Tourism+Travel+Hotel+Countryside.

This tree structure mentions and lists many more activities such as job offers, car sales, apartment rentals, meetings, games etc. and makes it possible to select the activities focused with the required precision in all domains such as commerce, services and leisure activities. The different elements and modules of the device are housed in the casing 15, of FIG. 1, in such a way as to create a portable device 16, thus nomadic.

Alternatively, all or part of the device is adaptable to several other means of management and remote communications to retain the selected codes from the nomenclature base.

Interface 10, may be connected to a fixed receiver connected physically to cable networks, to make them able to communicate selective services.

Interface 11 may be connected to linked mobile receivers which receive information broadcasts in high frequency by a radio, television or "alphapage" network. This allows the user to select only the releases or programs which interest him.

Interface 12 may be connected to mobile phone systems to make them selective according to his method. This variant envisages using the keyboard and the sound and visual means of the cellular peripheral unit.

The set-up of the method operates in the following way:

After setting the device 16, in programming mode, the user selects a goal, a sector of activity or a pole of interest in the nomenclature. This selection of parameters is operated by listing on screen 4 of device 16, the different positions of divisions, groups, classes and locations of the nomenclature in place with the keys of selection and data introduction means 5. These keys command horizontal and vertical movements in the nomenclature as well as the different command features, among others for programming, selecting and memorizing. Once the selection has been defined, the user activates the memorization key and puts the device 16 in stand-by. Several selections can be memorized to be broadcast simultaneously and are stacked in the memory 14 so as not to restrict the user.

Figure 2:
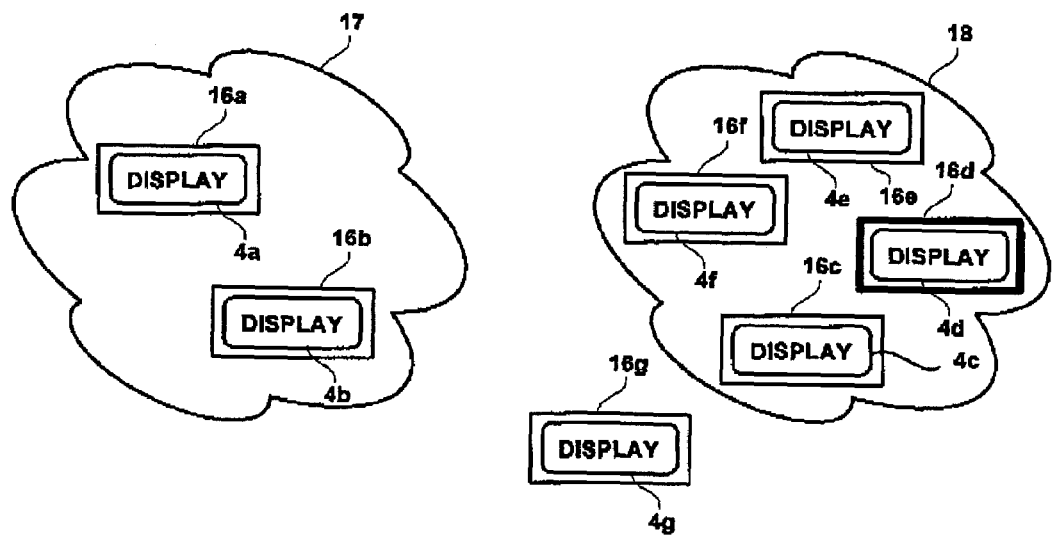
FIG. 2 represents a diagram of two transmission loops generated by the presence of devices according to the invention during operation.

Once set in stand-by mode, the device 16, broadcasts the selected parameter(s) under coded form alternating transmission and reception. When the user carries the device 16*a* in stand-by and he arrives in the operational space of a second device 16*b* in stand-by, the two devices 16*a* and 16*b* generate a transmission space 17, as shown in FIG. 2, in which the broadcast codes transit, in particular those which match with those programmed by the users. If there is matching between at least one of the memorized codes in each of them, the devices 16*a* and 16*b* indicate the availability by at least one visual and sound signal and display the selected element(s) on both screens 4*a*, 4*b*. The selected pole of interest appears on screen 4*a* of the first device 16*a* in the language chosen by the user. This language can be different from that programmed in the other device 16*b* which will display on screen 4*b* a translation of the demand made through the device 16*a*. The conversational mode between devices 16*a* and 16*b* is automatically managed as soon as the transmission loop 17 is created by the presence of the devices in the same spaces where the said devices synchronize alternately in master and slave position to broadcast and receive the selected codes.

The method and the technique according to the invention are operational with a variable number of devices in the same transmission space. While devices 16*a* and 16*b* which have a common selected code generate between themselves a transmission space 17, the devices 16*c*, 19*d*, 16*e*, present at another distance, generate a second neighboring transmission space 18. The device 16*f* entering in the transmission space 18 is positioned alternately as master or slave with the other devices 16*c*, 19*d*, 16*e*, while taking into account the device 16*g* which leaves the said transmission space 18. In the case of matching selected codes, the devices concerned among 16*c*, 19*d*, 16*e*, 16*f*, show up by at least a sound signal and the display of the selected elements on the screens 4*c*, 4*d*, 4*e*, and 4*f*. The device 16*g* which has left the loop stops all signaling of opportunities, both acoustic and visual on screen 4*g*.

The method and the technique according to the invention are also operational with a variable number of transmission spaces. In the case where the transmission spaces 17, and 18, move geographically, they could then assemble to form a transmission knot at an operational distance where the devices 16*a*, 16*b*, 16*c*, 19*d*, 16*e*, 16*f* position themselves alternately as master or slave. In the case where device 16*g* is still present, it will be absorbed in the new space constituted as a function of the operational distance and integrated into the conversational mode in force in situ.

Device 19*d* is a non-mobile ensemble constituting a fixed terminal whose aim is to create or extend the directions and signs of a business such as a hotel, an employment agency, a garage etc. In this case, the users carrying devices 16*c*, 16*e*, 16*f*, generate the transmission loop 18, at an operational distance from the device 19*d* where they receive confirmation of the opportunity of room availability, a job offer or the car they are looking for. Since several other neighboring businesses can use the devices according to the invention, the terminals can be seen because of a powerful luminous sign, which makes it possible to recognize the correct interlocutor visually.

In general, to avoid management of a voluminous or non-adapted data base, the common nomenclature is modifiable and extensible by reformatting in each language and in all sectors of activity. This operation is carried out by activating the function "Reprogramming" from the selection and data introduction means 5 and by reprogramming the memories 13 and 14 from an external encoder.

In order to limit the number of portable devices at the disposal of users such as radio receivers, devices called alphapage and cellular telephones, software and equipment variants are integrated into the devices according to the invention to diversify and refine their respective services. These variants linked by interfaces 10, 11, 12 bring, in addition, selectivity by sector of activity and not only individually as is the case so far. Besides this, these variants make it possible to extend the fields of application to national and international levels, so as to make quasi-personalized targeted offers. Interface 10, is aimed at being connected to cable networks is available to apply, as an example, the device at the Internet level. Interface 11 is aimed at connecting peripherals by unidirectional high frequency transmissions such as radio and devices called alphapage, the data transmission means 8–9, in this case being adapted to identify broadcast signals superposed on the transmission wavelength. Interface 12 serves to link the said device to that of mobile cellular telephones. In this application, the various available components and software of existing cellular units are completed by those of the infrastructure of the devices enabling correct operation of the method according to the invention.

Even though the invention has been described in combination with special structures, it is not limited to these at all and numerous variants can be added, as for example an identical device but more or less powerful and/or sensitive with a view to being adapted to new applications such as access controls or localization of sites. It is also possible to program this device in different ways in order to adapt it to new applications or performances.

The combinations of the different embodiments shown in the drawings or described above do not extend beyond the framework of the invention.

The reference signs inserted after the technical characteristics mentioned in the claims have the only aim of aiding the understanding of the latter and do not in any way limit their scope.

What is claimed is:

1. Method for remotely and wirelessly connecting persons with common goals, interests and sectors of activity, comprising the steps of:
   providing a first mobile transmitter-receiver device and a second mobile transmitter-receive device, the first and second mobile devices each being configured to establish selected interactive wireless links by alternately broadcasting and receiving at least one user-selected code assigned to a selected one of the user's goals, interests and sectors of activity from a programmable database configured according to a standard common to the first and second mobile devices, the common standard defining a predefined nomenclature of user goals, interests and sectors of activity;
   in the first mobile device, selecting and memorizing at least one of the user goals, interests and sectors of activity according to the common standard in the first device,
   in the first mobile device, transmitting the assigned code of each of the selected and memorized goals, interests and sectors of activity;
   moving the first mobile device until it reaches an operational distance near to the at least one second mobile device;
   directly receiving any codes transmitted from the second mobile device, irrespective of a geographical location of the first mobile device, whenever the first and second mobile devices are turned on and are located within a predetermined operational distance from one another that defines a transmission space, the transmitting and receiving steps being configured to be initiated by either the users of the first or second mobile devices at any time, and
   signaling to users of both the first and second mobile devices when one or more user-selected codes transmitted by the first mobile device matches one or more codes transmitted by the second mobile device.

2. The method according to claim 1, wherein the first and second mobile devices are each configured to activate at least one of a sound signal and a display when one or more matching codes are detected within the transmission space.

3. The method according to claim 1, wherein the first and second mobile devices are further configured to
   define the transmission space by moving and switching on the first and second mobile devices within the predetermined operational distance from one another,
   identify matching codes,
   transmit the user-selected codes,
   alternately switching to and from master and slave mode to enable the first and second mobile devices to broadcast, to receive, to identify and to process the user-selected codes.

4. The method according to claim 1, wherein when a first one of the first or second mobile devices arrives within the predetermined operational distance of another of the first and second mobile devices, the method further comprises steps of:
   switching alternately to a master-slave mode and broadcasting its selected and memorized codes to cause the other ones of the first and second mobile devices to carry out steps of:
   comparing memorized and received codes, and
   signaling the user when at least one memorized code matches at least one received codes.

5. The method according to claim 1, wherein the nomenclature is modifiable and extensible by the user through a user interface and the display.

6. Mobile device for the remote connection of persons with common goals, interests and sectors of activity, comprising:
   at least one power supply;
   a micro-controller coupled to the power supply, the micro-controller being coupled to:
   at least one display,
   a user interface for at least one of selecting and inputting data;
   at least one means for signaling the user;
   at least one transmitter and at least one receiver;
   a first memory configured to store operational software for the mobile device and a programmable database configured to store user-selected codes assigned to respective ones of goals, interests and sectors of activity of the user, the user-selected codes conforming to a common standard, the common standard defining a predetermined nomenclature of user goals, interests and sectors of activity, and
   a second memory configured to store a downloadable database and other operational software,
   wherein the mobile device is configured to alternately broadcast the user-selected codes corresponding to the user's goals, interests and sectors of interests and to directly receive codes from an other mobile device, irrespective of a geographical location of the mobile device, whenever the mobile device is turned on and located within a predetermined operational distance from the other mobile device, so as to define a transmission space, the mobile device being further configured to signal the user when one or more of the received codes matches one or more of the user-selected codes stored in the programmable database.

7. Device according to claim 6, wherein the mobile device further includes at least one interface configured to enable selected peripheral devices to connect to the mobile device to facilitate selection of the user's goals, interests and sectors of interests.

8. Device according to claim 6, further comprising a bus coupled to the micro-controller, to the at least one display, to the user interface, to the at least one transmitter and to the at least one receiver.

9. Device according to claim 6, further comprising a casing that encloses the at least one power supply, the micro-controller, the at least one display, the user interface, the at least one transmitter and the at least one receiver to form a portable mobile device.

* * * * *

UNITED STATES PATENT AND TRADEMARK OFFICE
CERTIFICATE OF CORRECTION

| | |
|---|---|
| PATENT NO. | : 7,010,314 B1 |
| APPLICATION NO. | : 09/700697 |
| DATED | : March 7, 2006 |
| INVENTOR(S) | : Jean-Francois Taillens |

It is certified that error appears in the above-identified patent and that said Letters Patent is hereby corrected as shown below:

Column 8, line 61, replace "interests" with -- activity --.

Column 9, line 11, replace "interests" with -- activity --.

Signed and Sealed this

Eighteenth Day of March, 2008

JON W. DUDAS
*Director of the United States Patent and Trademark Office*